United States Patent Office 3,495,370
Patented Feb. 17, 1970

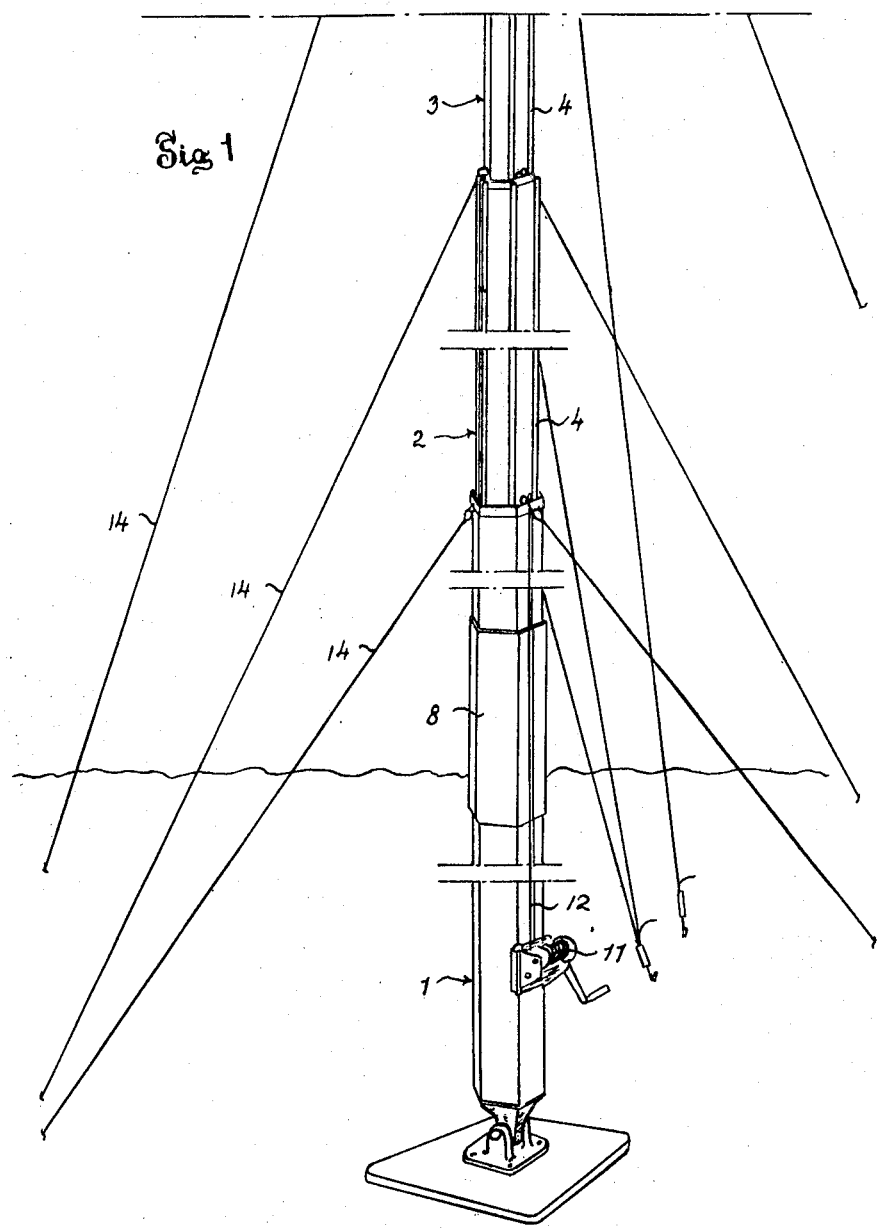

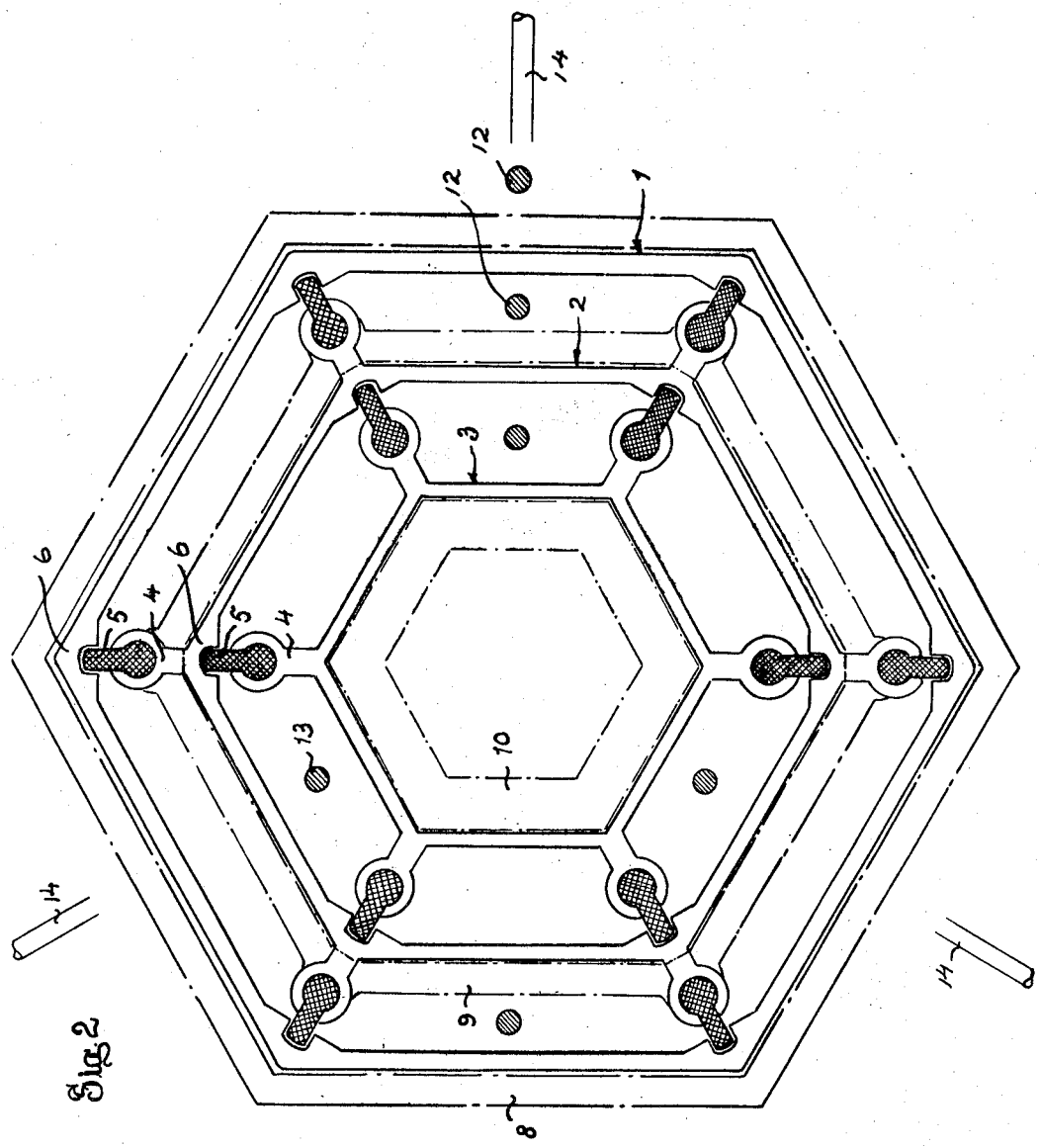

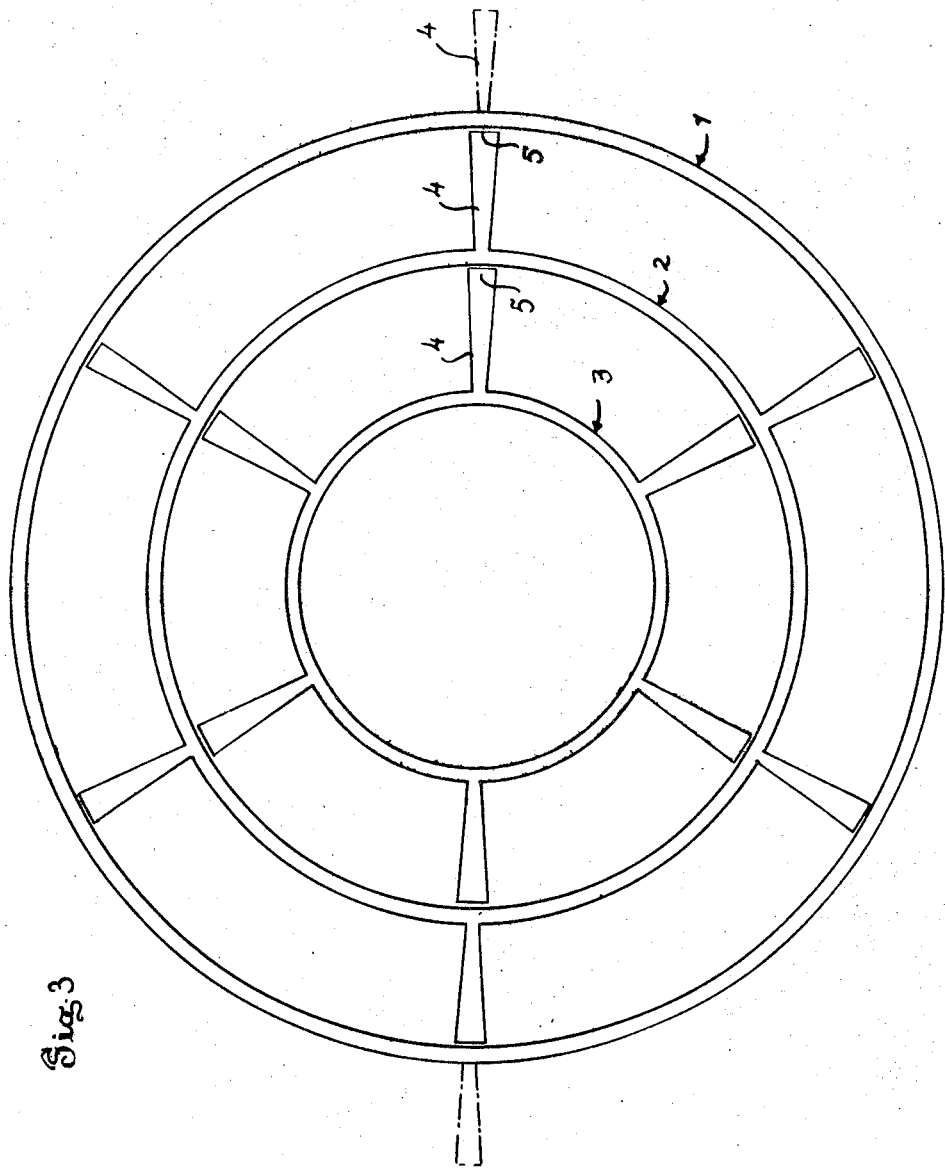

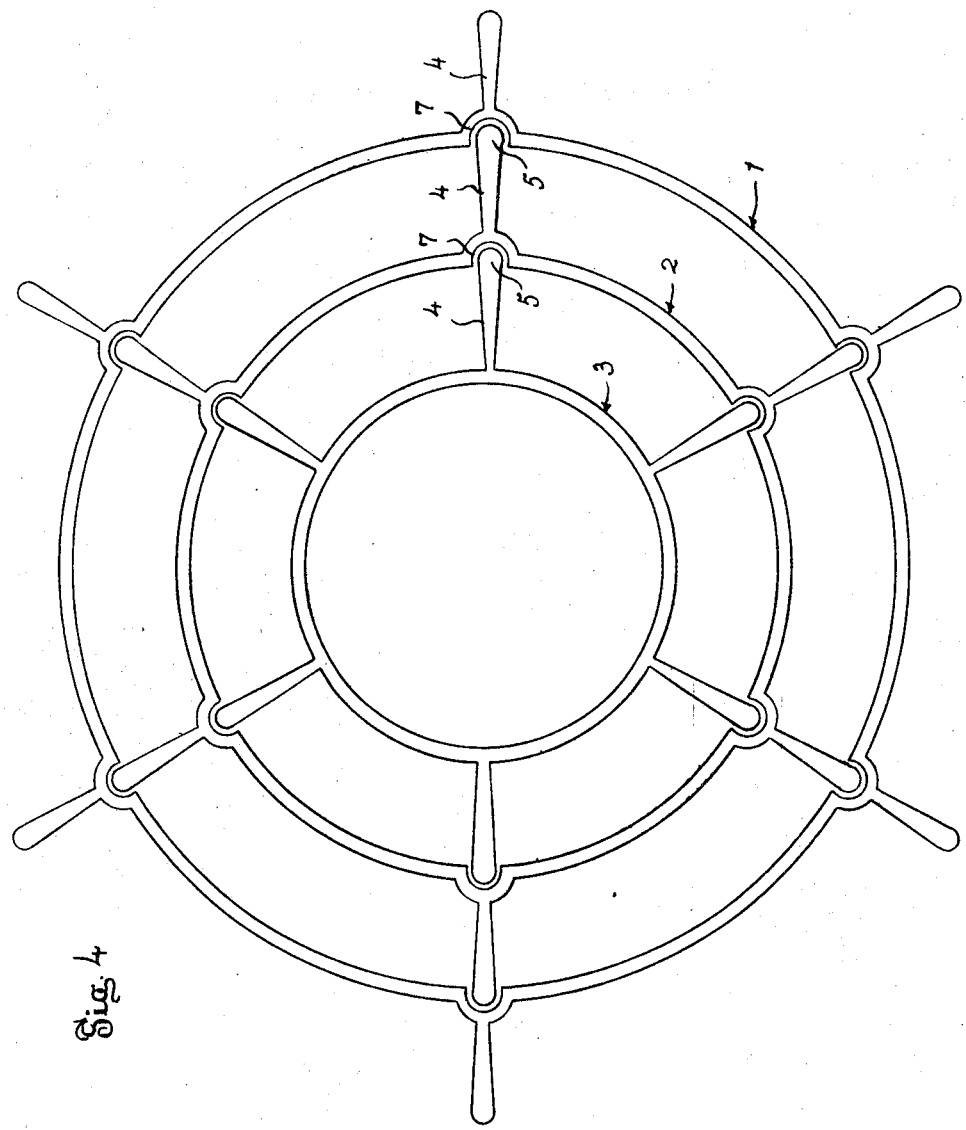

3,495,370
TELESCOPIC MAST
Lars Bertil Habro, Lidingo, and Dan Harry Gilbert Oberg, Danderyd, Sweden, assignors to AB Vagbelysnign, Stockholm, Sweden
Filed Nov. 28, 1967, Ser. No. 686,212
Claims priority, application Sweden, Nov. 28, 1966, 16,221/66
Int. Cl. E04h *12/34, 12/18*
U.S. Cl. 52—632                                    7 Claims

ABSTRACT OF THE DISCLOSURE

A telescopic mast for antennas and lighting fittings comprises a number of telescoping tubes. Of these tubes at least the inner ones are provided with a number of flanges radially projecting therefrom and distributed on the periphery thereof. These flanges are adapted to have their outer portions cooperate with the inner surfaces of the adjoining tubes so as to guide the tubes of the telescopic mast.

---

This invention relates to a telescopic mast which is particularly intended to support antennas or lighting fittings and the mast comprises a number of telescoping tubes so designed as to leave a space between them for accommodating cables or like means by which the different tubes can be raised and lowered relative to each other. The telescopic mast according to the present invention is characterized in that at least the inner tubes are provided with a number of flanges projecting radially therefrom and distributed on the periphery thereof, said flanges being adapted to have their outer portions cooperate with the inner surfaces of the adjoining tubes so as to guide the telescopic mast tubes. The invention thus provides a telescopic mast to which the flanges impart an excellent stability and in which precisely the flanges provide the space necessary for the mast raising cables.

The above features of the invention will be more fully described in the following with reference to the accompanying drawings which illustrate some embodiments, chosen by way of example, of the telescopic mast.

In the drawings:

FIGURE 1 is a perspective view of part of the telescopic mast in one embodiment thereof;

FIGURE 2 is a cross section of the telescopic mast of FIGURE 1;

FIGURES 3 and 4 are cross sections of the telescopic mast in two further embodiments thereof.

The telescopic mast illustrated comprises two or more telescoping tubes 1–3 of which at least the inner tubes 2 and 3 are provided with a number of flanges 4 projecting radially therefrom and distributed on the periphery thereof. The flanges 4 are adapted to have their outer portions 5 cooperate with the inner surfaces of the adjoining tubes so as to guide the tubes 1–3 of the telescopic mast.

In the embodiment shown in FIGURE 3, the outer portions 5 of the flanges 4 are adapted to engage the inner circumferential surfaces of the circular-cylindrical tubes 1 and 2 so that the tubes 1–3 are rotatable with respect to each other. In the embodiment shown in FIGURES 2 and 4 the tubes 1 and 2 are provided on their inner surfaces with guides 6 and 7, respectively, in which the outer portions 5 of the flanges 4 are adapted to engage for non-rotatably guiding the tubes 1–3 in each other.

In the embodiment according to FIGURE 2 the tubes are of polygonal cross section, the guides 6 on the inner sides of the tubes being situated at the corners of the sides of the polygonal sections. The polygonal section is in the form of a regular polygon; FIGURE 2 illustrates the section as a regular hexagon.

In the embodiment according to FIGURE 4, the tubes are of circular cross section, the guides 7 in the inner surfaces thereof having the form of longitudinal grooves. The guides could also be formed by ribs or studs on the inner surfaces of the tubes, between which the outer flange portions 5 are engaged.

The guides 6 and 7 on the inner surfaces of the tubes are arranged opposite the flanges 4 radially projecting from the tubes, whereby said flanges will be directly aligned. To realize adequate guidance, each tube has at least three flanges 4 uniformly distributed on the tube periphery. In the preferred embodiments illustrated, the tubes have six flanges 4 of increasing thickness towards the free flange ends. In other embodiments, the flanges may be of constant or diminishing thickness.

The outer tube 1 need not necessarily have flanges 4, provided that the tube 1 otherwise is of sufficient strength, which is the case in the embodiment illustrated in FIGURE 2. It may be justified to retain the flanges whenever it is desired to joint the respective tubes; in such a case the flanges 4 may form fastenings for jointing means. The jointing means may comprise jointing sleeves 8–10, as shown in the embodiment of FIGURES 1 and 2. The jointing sleeve 8 for tube 1 is arranged on the flangeless outer surfaces of the tube. The jointing sleeve 9 for the 2 is disposed on the outer surfaces of the tube, for which reason the flanges 4 at the joint have been transferred from the tube portions 2 to the jointing sleeve 9. The jointing sleeve 10 for tube 3 is provided on the flangeless inner surfaces of the tube.

At least the flange-bearing tubes 1–3 are made from extruded light alloy, for instance aluminum, or synthetic plastic material. With metal tubes 1–3 the outer flange portions 5 may preferably be made from synthetic plastic material, as shown in FIGURE 2. This will reduce the friction between the different tubes 1–3 of the telescopic mast and also diminish the risk of condensation water collecting at the contact points, thus eliminating the risk of the tubes freezing together.

Making the outer portions 5 of the flanges 4 of the metal tubes from synthetic plastic material, e.g. nylon, provides the advantage that the tubes 1–3 will be electrically insulated from each other, whereby they can be used as, or be combined with, capacitors and the like.

The mechanism for raising the different tubes 1–3 is of conventional construction, and it will therefore be superfluous to enter upon a detailed description of said mechanism in this connection. However, 11 designates a winch and 12 and 13 wires for raising the intermediary section 2 and the top section 3. Stays are designated 14.

What we claim and desire to secure by Letters Patent is:

1. A telescopic mast comprising a plurality of telescoping tubes, and a plurality of radial flanges secured to at least the inner tubes and distributed on the periphery thereof, said radial flanges extending longitudinally along the respective tubes for the entire length thereof, said flanges including inner portions integral with the associated tubes and outer portions adapted to cooperate with the inner surfaces of the adjoining tubes so as to guide the telescoping tubes during extension and retraction thereof and prevent relative rotation, said tubes and the inner portions of the radially projecting flanges being made from extruded, light weight metal which is relatively rigid, said outer portions of the flanges being made from synthetic plastic material.

2. A telescopic mast as claimed in claim 1 comprising guide means on said tubes at the inner surfaces thereof for engaging the flanges of the adjoining tubes for the non-rotatable guiding of the tubes with one another.

3. A telescopic mast as claimed in claim 2, in which the tubes are of circular cross-section and said guide means on the inner surfaces of the tubes is constituted by longitudinal grooves therein.

4. A telescopic mast as claimed in claim 2 in which the guide means on the inner surfaces of the tubes is disposed opposite the flanges radially projecting from adjoining inner tubes.

5. A telescopic mast as claimed in claim 1 in which the tubes are of polygonal cross-section, said guide means on the inner surfaces of the tubes being situated at the corners of the polygonal sections.

6. A telescopic mast as claimed in claim 1, in which the tubes are provided with at least three flanges radially projecting therefrom.

7. A telescopic mast as claimed in claim 1, wherein said flanges are relatively flat and extend radially a substantially greater distance compared to their thickness.

References Cited

UNITED STATES PATENTS

| | | |
|---|---|---|
| 2,835,520 | 5/1958 | Schiring et al. |
| 2,949,692 | 8/1960 | Kuhn. |
| 3,102,742 | 9/1963 | Shurcliff. |
| 3,160,249 | 12/1964 | Pavlecka _____ 52—738 X |
| 3,213,574 | 10/1965 | Melbye et al. _____ 52—121 |
| 3,312,487 | 4/1967 | McIntyre. |

FRANK L. ABBOTT, Primary Examiner

P. C. FAW, JR., Assistant Examiner

U.S. Cl. X.R.

52—118, 121